(No Model.) 3 Sheets—Sheet 1.

A. J. PAINTER.
MOTOR FOR STREET CARS.

No. 468,824. Patented Feb. 16, 1892.

WITNESSES
Albert Popkins
G. M. Copenhaver

INVENTOR
A. J. Painter
By McRuff
Atty (No Model.) 3 Sheets—Sheet 3.

A. J. PAINTER.
MOTOR FOR STREET CARS.

No. 468,824. Patented Feb. 16, 1892.

WITNESSES.
Albert Popkins.
G. M. Copenhaver

INVENTOR.
A. J. Painter
By Ass Ruff
Atty

UNITED STATES PATENT OFFICE.

ALONZO J. PAINTER, OF PASADENA, CALIFORNIA.

MOTOR FOR STREET-CARS.

SPECIFICATION forming part of Letters Patent No. 468,824, dated February 16, 1892.

Application filed June 24, 1891. Serial No. 397,403. (No model.)

*To all whom it may concern:*

Be it known that I, ALONZO J. PAINTER, of Pasadena, in the county of Los Angeles and State of California, have invented certain new and useful Improvements in Motors for Street-Railway Cars; and I do hereby declare the following to be a full, clear, and exact description of the invention, such as will enable others skilled in the art to which it appertains to make and use the same.

My invention relates to improvements in speed and power regulating devices for the motors of street-railway cars and other vehicles.

The object of the invention is to provide simple, economical, and efficient means for starting, stopping, and reversing the movement of street-cars and increasing or decreasing the speed thereof without the necessity of interfering with the motor in any manner, which may run at a constant speed in one and the same direction.

The invention consists, essentially, in a series of differential pulleys keyed to the shaft of any suitable motor—such as a gas, naphtha, or steam engine, or electric motor—connected by means of loose belts with a series of similar pulleys keyed to a driving-shaft, having bevel-pinions adapted to be thrown into gear with crown or bevel gear-wheels, loose upon the axles, and a series of tightening-pulleys adapted to be engaged with the loose belts for rotating said shaft, means being also provided whereby the crown-wheels are thrown into gear with clutches by which movement is imparted to the axle and wheels, as will be hereinafter fully described and claimed.

Figure 1:
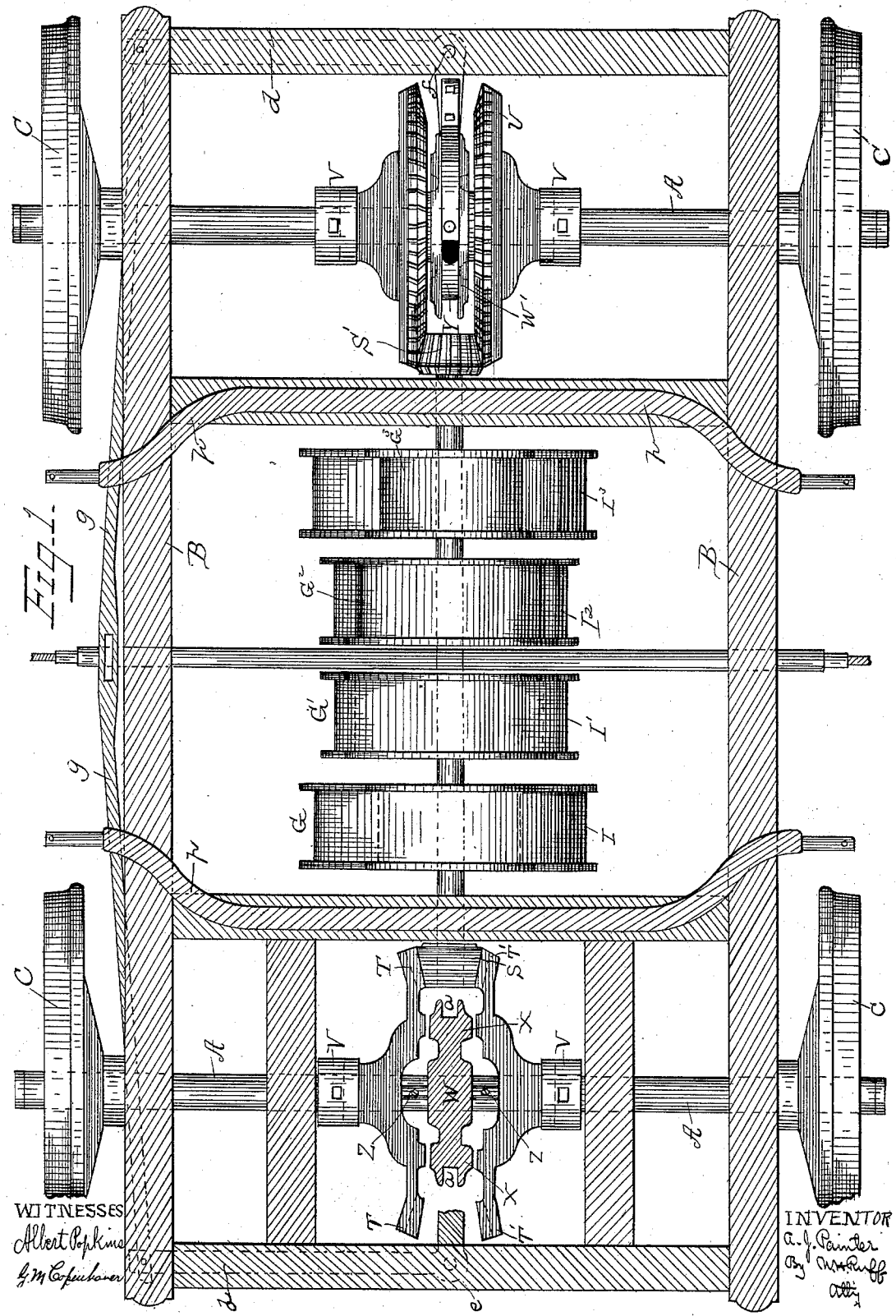
Figure 2:
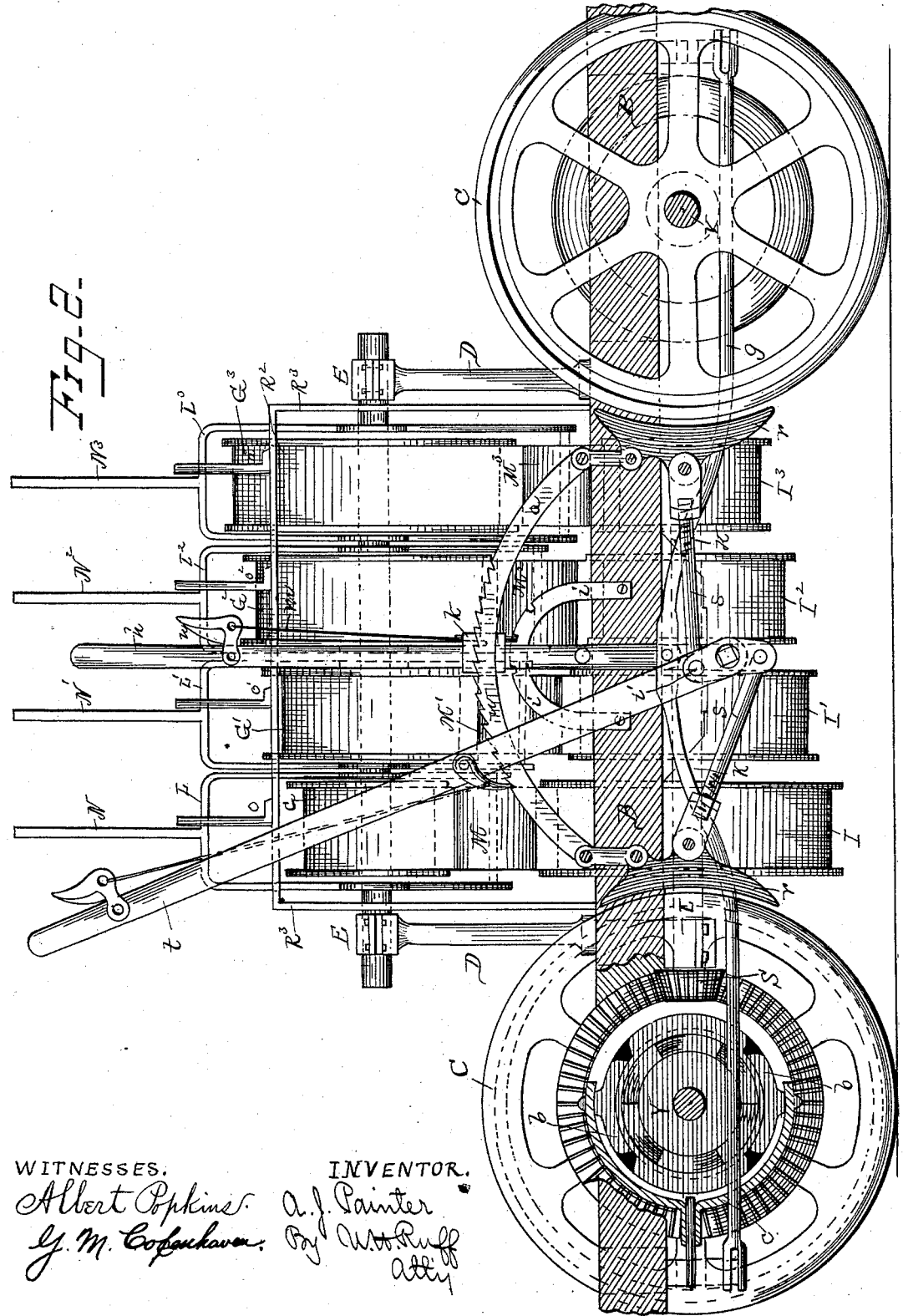
Figure 3:
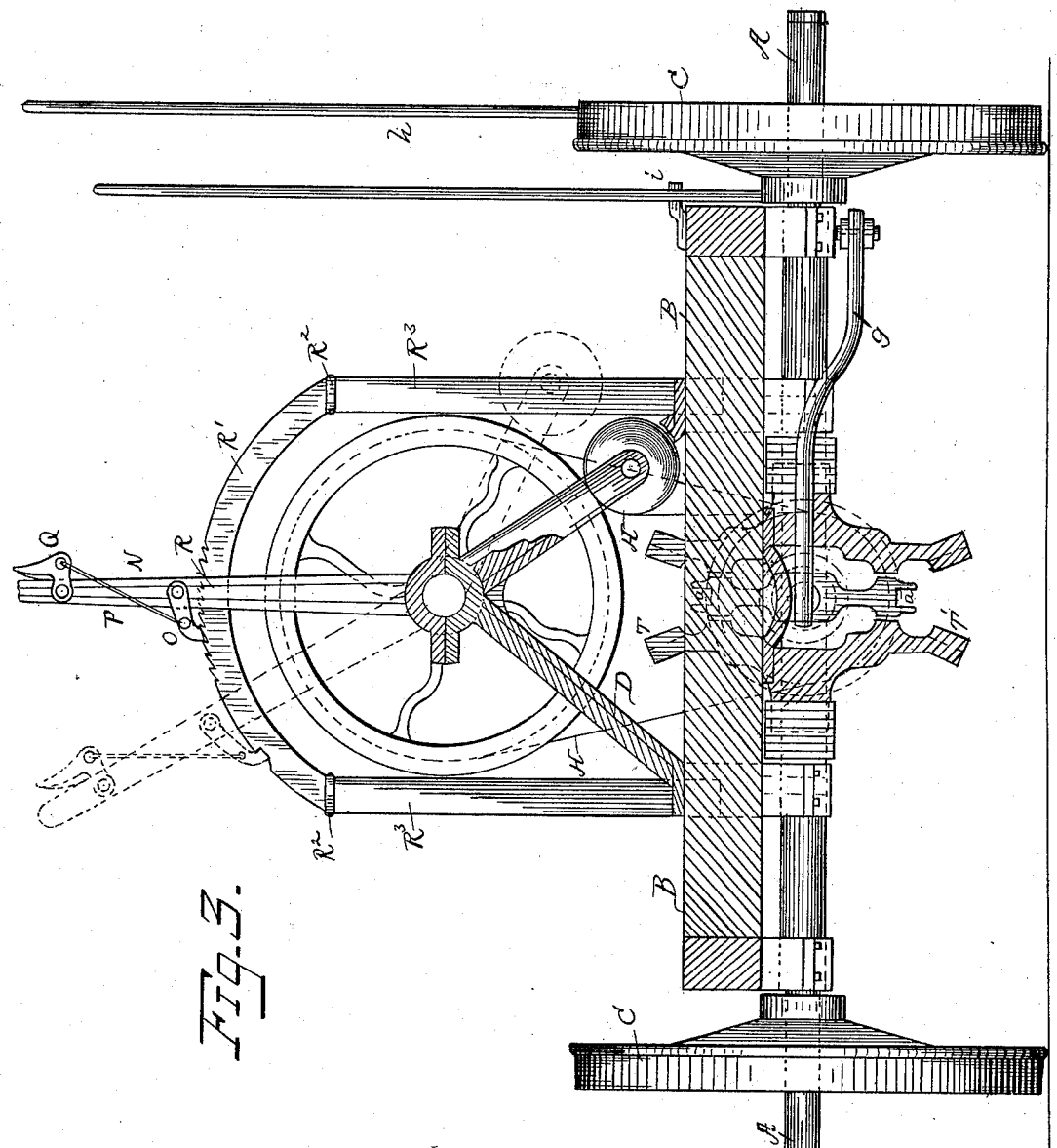

In the accompanying drawings, Figure 1 is a plan view, partly in section, of a speed-controlling device constructed in accordance with my invention. Fig. 2 is a side view of the same, part being broken away to show the construction of the clutch. Fig. 3 is an end view.

In the said drawings, the reference-letter A designates the axles of a street-car, B the frame supported thereby, and C the wheels. Secured to said frame are diagonal or inclined standards D, having boxes or bearings E, in which is journaled the motor-shaft F, driven by any suitable motor. (Not shown.) Keyed or otherwise secured to this shaft is a series of differential pulleys G G' G² G³, of gradually-increasing diameter, connected by means of loose belts H with a series of similar pulleys I I' I² I³ fixed to the driving-shaft K, journaled in bearings L on the under side of the frame B. These pulleys may vary in number, four of each being shown in the present instance, and they are arranged reversely to each other—that is to say, the smallest pulley on the motor-shaft is opposite to and connected with the largest pulley on the driving-shaft, the next smallest pulley on the motor-shaft with the next largest pulley on the driving-shaft, and so on throughout the series.

Loosely pivoted in the motor-shaft is a series of bifurcated bent levers L L' L² L³, the bifurcations of each of said levers embracing one of the pulleys on said shaft and provided at their lower ends with loose pulleys M M' M² M³, which are journaled therein. These bifurcations are joined together at their upper ends and provided with handles N N' N² N³, having pawls O, connected by means of rods P with spring-actuated hand-pieces Q, pivoted to said handles. These pawls are adapted to engage with rack-teeth R upon quadrants R', carried by horizontal bars R², supported by standards or uprights R³, secured to the frame B.

The driving-shaft K at each end is provided with a bevel-pinion S S', adapted to mesh with the crown-wheels T T' and U U', loosely mounted on the axles C, being held in place by means of collars V, so as to prevent any lateral movement upon the axles. Intermediate of these crown-wheels are clutch-wheels W W', having a series of ratchets or clutches X upon each face, which are adapted to engage with corresponding clutches on the inner faces of the crown-wheels. These clutch-wheels are provided with grooves Y, with which engage splines or feathers Z on said axles, so that as they revolve or rotate a corresponding motion is imparted to said axles. They are free, however, to move laterally on the axles, so as to throw them in engagement with one or the other of said crown-wheels at each end of the car, as will hereinafter be set forth. These clutch-wheels are provided with peripheral grooves $a$, within which are seated segmental dogs $b$, connected with arms $c$ $c$, which in turn are connected with the laterally-extending bent levers $d\ d$, pivoted at $e\ f$ to the frame B. The outer ends of levers $d\ d$ are connected with the horizontal rod or bar $g$, and at its center this rod is connected with the lower end of a vertical lever $h$, pivoted to the frame B at $i$ and provided with a pawl $k$, which engages with a notched segment $l$, by which said lever is held in position. The pawl $k$ is connected by means of rod $m$ with a spring-actuated hand-piece $n$.

The letter $p$ designates the brake-beams, $r$ the brake-shoes, $s\ s$ connecting-rods, and $t$ the brake-lever, having pawl $w$ engaging with segment $w'$, by means of which the brakes are set and released. These features, however, do not constitute any part of my present invention, and a detailed description thereof is not necessary.

The operation is as follows: When the lever $h$ is in a perpendicular position, the pinions on the ends of the driving-shaft are out of engagement with the crown-wheels on the axles. To start the car, say, in the direction indicated by the arrows, the lever $h$ is actuated so as to move the bar $g$ forwardly, which, by means of levers $d$, will cause the dogs $b$ to move the clutch-wheel W to be thrown into engagement with the crown-wheel T, and the clutch-wheel W' into engagement with the opposite crown-wheel U at the other end of the car. By now throwing one of the tightening-pulleys $v$ into engagement with its belt (the motor-shaft being in motion) the driving-shaft will be rotated through the medium of the pulleys therein and the pulleys on the motor-shaft, and by means of the pinions and crown-wheels rotate the axles. In starting the car, the belt-connecting pulleys G and I should be tightened first, which will give a slow speed with great power. When the car is in motion, this belt is released and one of the other belts tightened, according to the speed required, whereby the speed will be increased and the power diminished in the same proportion, thus giving great power at a slow speed for starting the car, rounding curves, going up-hill, &c.

The car can be stopped by throwing all the belt-tighteners out of engagement with the belts or by throwing the clutches out of mesh with the crown-wheels and applying the brakes.

To reverse the movement of the car, the lever $h$ is reversed, when the clutches will be thrown into mesh with the other crown-wheels.

Having thus described my invention, what I claim is—

1. In a speed and power controlling device for street-cars, the combination, with the motor and driving shafts, the differential pulleys, the loose belts, and levers carrying tightening-pulleys, of the bevel-pinions on the ends of the driving-shaft, the axles carrying loose crown-wheels, and the laterally-movable clutch-wheels adapted to be thrown into and out of mesh with said crown-wheels, substantially as described.

2. In a speed and power controlling device for street-cars, the combination, with the motor and driving shafts, the differential pulleys, the loose belts, and the levers carrying tightening-pulleys, of the bevel-pinions on the driving-shaft, the axles having splines, the loose crown-wheels on the axles, the clutch-wheels having grooves in which said splines work and provided with peripheral grooves, the vertical pivoted lever, the horizontal bar connected therewith, and the bent levers having arms provided with dogs, which fit in said peripheral grooves of the clutch-wheels, by which they are moved laterally to mesh with the crown-wheels, substantially as described.

3. In a speed and power controlling device for cars, the combination, with a motor-shaft and a series of differential pulleys thereon, and a driving-shaft provided with a corresponding series of similar pulleys, loose belts, and tightening-pulleys, of levers carrying said tightening-pulleys, the clutch-wheels on the axles provided with peripheral grooves, segmental dogs working in said grooves, laterally-extending bent levers pivoted to the frame and connected with arms carrying said dogs, the bar connected to the outer ends of said levers, and the vertical lever pivoted to the frame and connected with said bar, as set forth.

In testimony whereof I have signed this specification in the presence of two subscribing witnesses.

ALONZO J. PAINTER.

Witnesses:
F. J. DECKER,
W. N. HALL.